United States Patent
Yang

(10) Patent No.: US 6,779,959 B1
(45) Date of Patent: Aug. 24, 2004

(54) BELT OF NAILS FOR NAILERS

(75) Inventor: Brad Yang, Tali (TW)

(73) Assignee: Testo Industry Corp., Tali (TW)

( * ) Notice: Subject to any disclaimer, the term of this patent is extended or adjusted under 35 U.S.C. 154(b) by 0 days.

(21) Appl. No.: 10/419,553

(22) Filed: Apr. 21, 2003

(51) Int. Cl.[7] ............................................... F16B 15/08
(52) U.S. Cl. ........................ 411/443; 411/441; 206/347
(58) Field of Search ................................ 411/440–443; 206/345–347, 338

(56) References Cited

U.S. PATENT DOCUMENTS

| | | | | |
|---|---|---|---|---|
| 3,212,632 A | * | 10/1965 | Baum et al. ................. | 206/346 |
| 3,828,925 A | * | 8/1974 | Magyar et al. ............. | 206/346 |
| 4,915,561 A | * | 4/1990 | Buhri et al. ................. | 411/439 |
| 5,046,396 A | * | 9/1991 | Pfister ........................ | 89/35.01 |
| 5,569,010 A | * | 10/1996 | Janssen et al. .............. | 411/441 |
| 5,931,622 A | * | 8/1999 | Gupta et al. ................ | 411/443 |

* cited by examiner

*Primary Examiner*—Flemming Saether
(74) *Attorney, Agent, or Firm*—Alan D. Kamrath; Nikolai & Mersereau, P.A.

(57) ABSTRACT

A belt of nails for nailers includes an outer belt, an inner belt and multiple nails. The outer and inner belts are parallel and respectively have multiple cylindrical outer and inner brackets connected in a straight line with connecting ribs between adjacent brackets. The outer and inner brackets respectively have axial outer and inner nail holes that are aligned. The nails have enlarged heads, shanks and tips. The shanks are mounted respectively through the outer nail holes, and the tips are mounted respectively inside the inner nail holes. Consequently, the outer and the inner belts securely hold the nails so the nailer will roof or nail perfectly.

3 Claims, 8 Drawing Sheets

BELT OF NAILS FOR NAILERS

BACKGROUND OF THE INVENTION

1. Field of the Invention

The present invention relates to a belt of nails for nailers, and more particularly to a belt of nails for rapidly acting nailers that will aid the nailer to nail perfectly.

2. Description of Related Art

Nailers, also called nail guns, are broadly used in roofing and attaching sheets of a material to a frame. The nailers are usually pneumatically or electrically powered. Each nailer typical has a nail magazine with a feed channel and a nail punch to reciprocally drive individual nails into a substance. The nails are belted in either a mechanical belt or tape and are held in the feed channel in the magazine of the nailer so the nails will be fed individually into position to be nailed. Therefore, the nailer can nail or roof continuously without stopping.

With reference to FIG. 8, nailers are used in some applications to drive nails into particularly hard objects, such as concrete walls. A belt of nails (not numbered) in accordance with the prior art is mounted in a nail magazine (not numbered) of a nailer (70). The nails (60) are mounted in a releasable belt (61), and each nail (60) has an enlarged head (not numbered), a shank (not numbered) and a tip (not numbered). The shank has a proximal end (not numbered) and a distal end (not numbered), and the enlarged head and the tip are formed respectively at the proximal end and the distal end of the shank.

The nailer (70) has a nail drive chamber (not numbered) and a nail punch (71). The magazine is attached to the nailer (70) and guides the belt of nails so the nail punch (71) can drive a nail (60) indexed in the nail drive chamber to fasten a wooden piece (80) onto a concrete wall (81). The conventional releasable belt (61) is made of plastic and selectively breaks so a nail (60) stuck by the nail punch (71) will be separated from the releasable belt (61) and be driven into the concrete wall (81). However, the releasable belt (61) is manufactured as a single piece. When a nail (60) is broken off of the releasable belt (61), breaking the releasable belt (61) may either apply a lateral force to the driven nail (60) causing the nail (60) to be driven into the wooden piece (80) and the concrete wall (81) at an angle or bend the releasable belt (61) so the next nail (60) is driven at an angle.

Furthermore, the concrete wall (81) will likely have a rough or irregular surface, and the tip of the separated nail (60) may be deflected and cause the nail (60) to be driven incompletely or at an irregular angle. A rough or irregular surface of a hard substance will cause the nailer to nail many tilted nails (60) or the operation of the nailer to be imprecise.

To overcome the shortcomings, the present invention provides a belt of nails for nailers to mitigate or obviate the aforementioned problems.

SUMMARY OF THE INVENTION

The main object of the invention is to provide a belt of nails for a nailer that will help the nailer to nail precisely.

Another object of the invention is to provide a belt of nails for a nailer to reduce the possibility of driving a nail at an incorrect angle.

Other objects, advantages and novel features of the invention will become more apparent from the following detailed description when taken in conjunction with the accompanying drawings.

DETAILED DESCRIPTION OF PREFERRED EMBODIMENT

Figure 1:
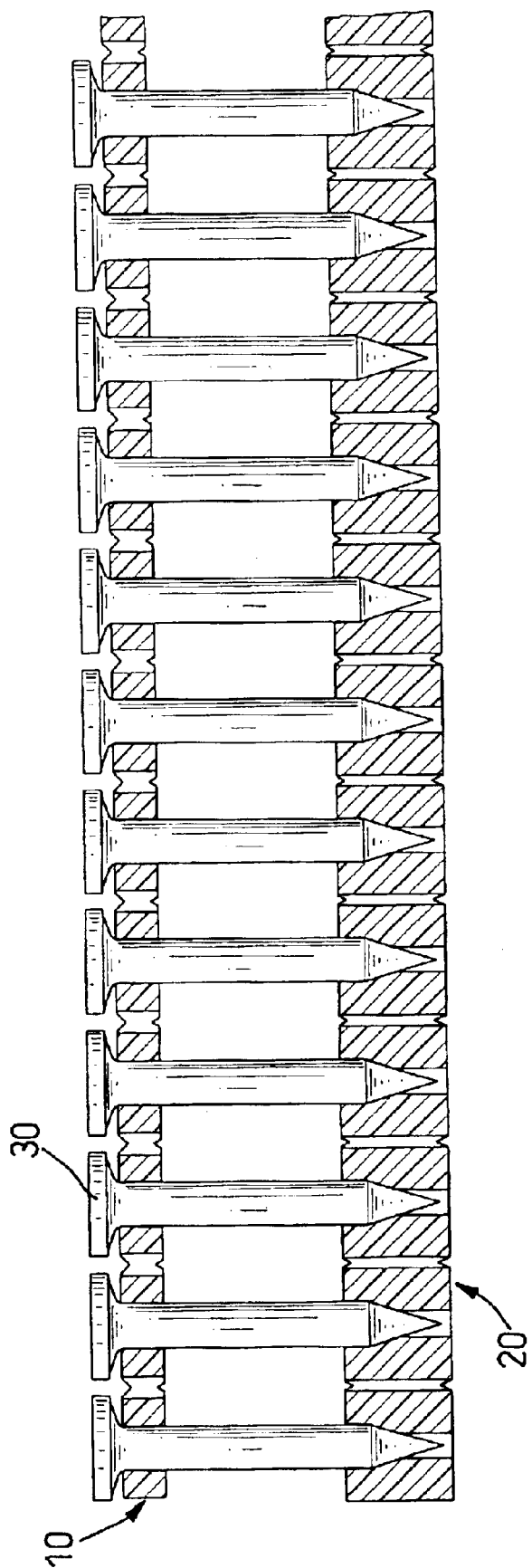
FIG. 1 is a side plan view in partial section of a belt of nails in accordance with the present invention.

With reference to FIG. 1, a belt of nails in accordance with the present invention comprises an outer belt (10), an inner belt (20) and multiple nails (30). The nails (30) are belted together by the outer and the inner belts (10, 20). The outer belt (10) and the inner belt (20) are made of a brittle material such as plastic. The nails (30) are conventional and may be masonry nails, roofing nails, finishing nails, etc. Each nail (30) has an enlarged head (not numbered), a shank (not numbered) and a tip (not numbered). The shank has a top end (not numbered), a bottom end (not numbered) and a uniform diameter (not shown). The enlarged head is formed at the top end, and the tip is formed at the bottom end of the shank.

Figure 2:
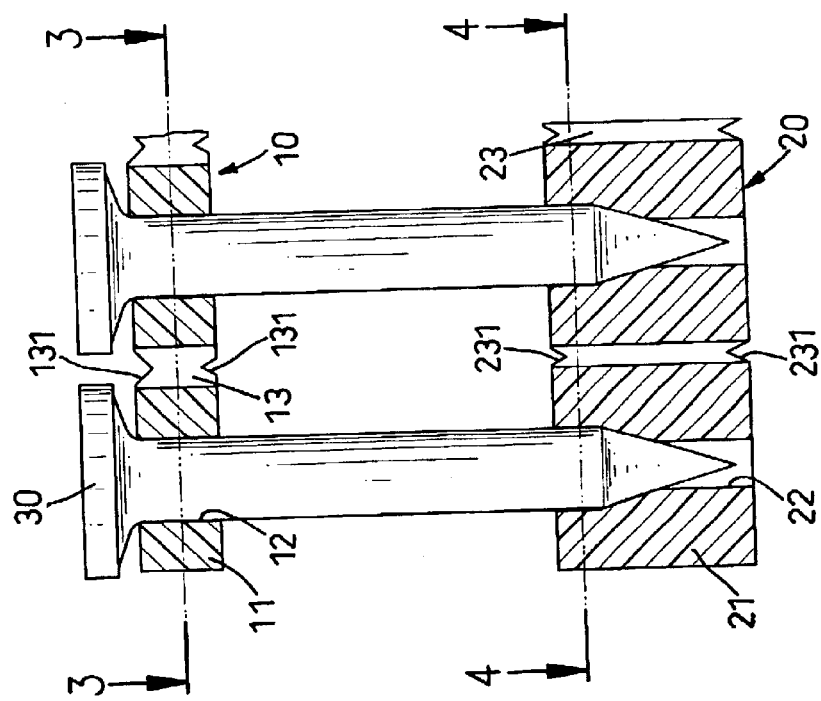
FIG. 2 is an enlarged side plan view in partial section of a portion of the belt of nails in FIG. 1.
Figure 3:
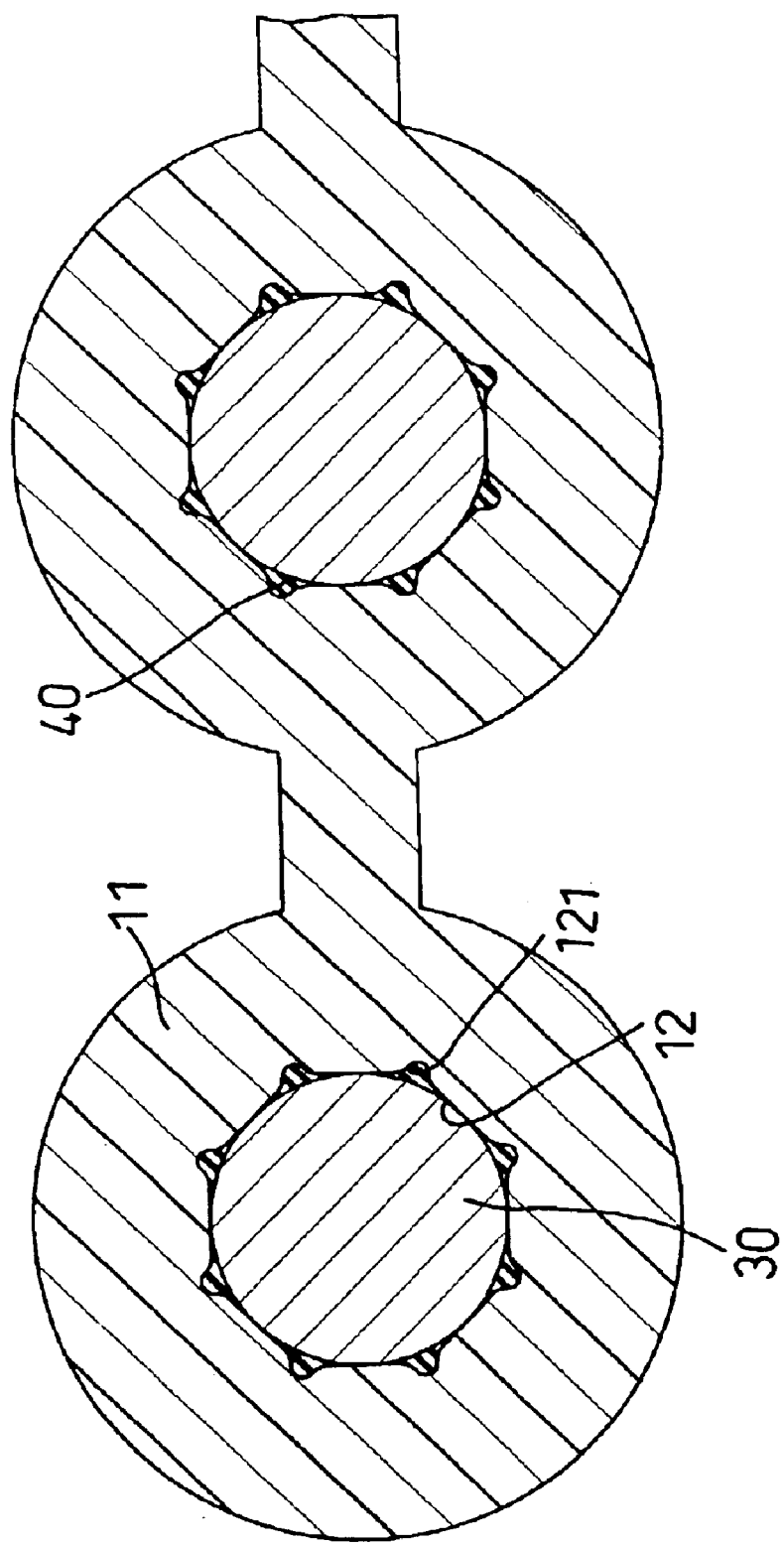
FIG. 3 is an enlarged cross sectional top plan view of the belt of nails along line 3—3 in FIG. 2.

With reference to FIGS. 2 and 3, the outer belt (10) comprises multiple outer brackets (11) and connecting ribs (13). The outer brackets (11) and connecting ribs (13) are connected alternately to each other in a straight line. Each outer bracket (11) is cylindrical and has a top end (not numbered), a bottom end (not numbered), a central axis (not shown), an external periphery (not shown) and an outer nail hole (12). The outer nail hole (12) is defined axially through the outer bracket (11) from the top end to the bottom end and has a diameter (not shown), an inner surface (not shown) and multiple longitudinal grooves (121). The longitudinal grooves (121) are defined equidistance apart on the inner surface of each outer nail hole (12). The tip of each nail (30) passes through and extends out of the outer nail hole (12), and the shank is held in the outer nail hole (12) with the enlarged head virtually abutting the top end. The diameter of the outer nail hole (12) is smaller than the diameter of the shank of the nail (30) so the nail (30) will be tightly held in that the outer bracket (11). An adhesive substance such as glue (40) can fill the longitudinal grooves (121) to hold the shanks of the nails (30) more firmly.

The outer connecting ribs (13) are formed integrally with and protrude transversally from the external periphery of one outer bracket (11) and connect adjacent outer brackets (11) together. The outer connecting rib (13) has a top (not numbered), a bottom (not numbered) and two outer notches (131). The outer notches (131) are defined respectively in the top and the bottom of the outer connecting rib (13). Hence, the outer connecting rib (13) will break smoothly more easily when the outer brackets (11) are separated from the belt of nails because of the outer notches (131).

Figure 4:
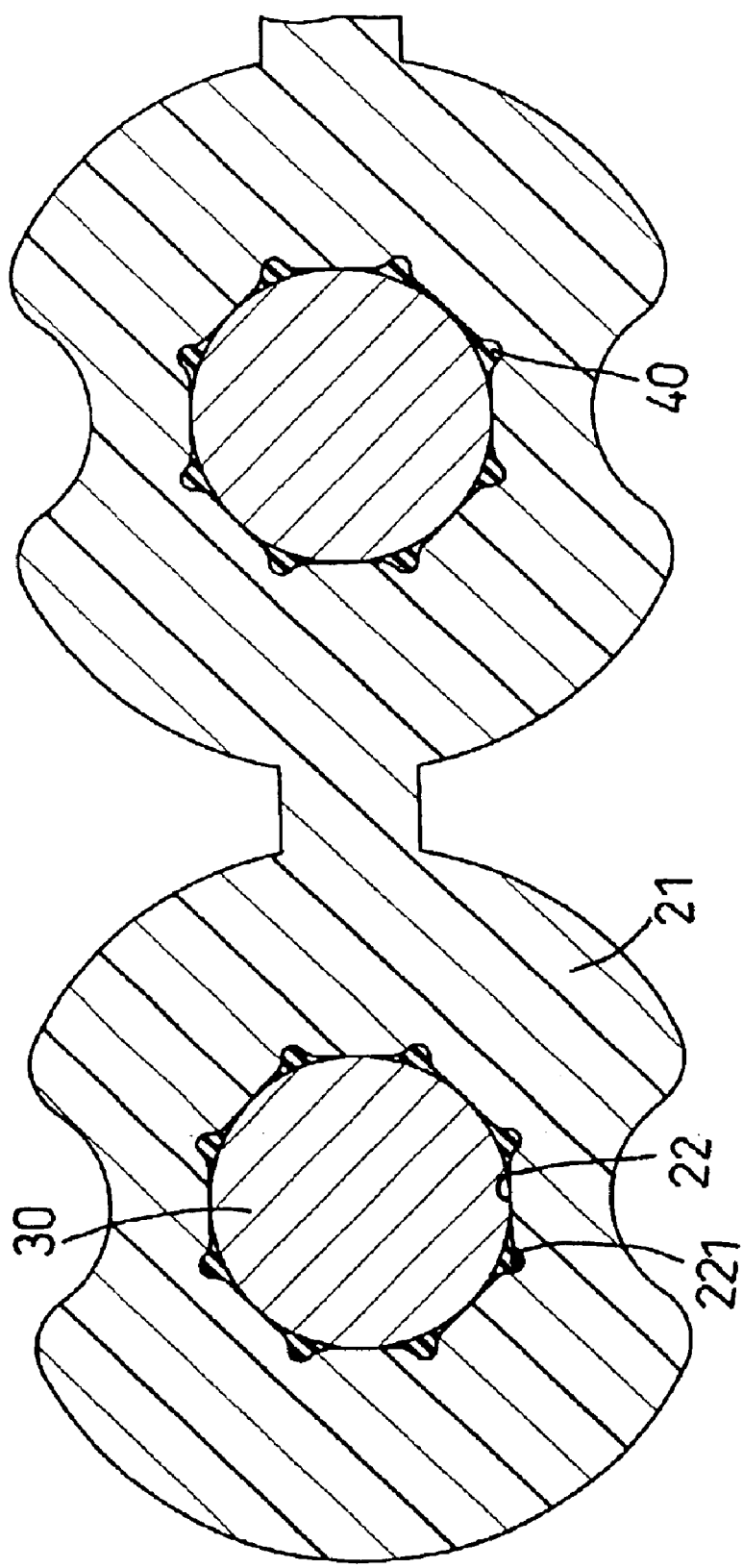
FIG. 4 is an enlarged cross sectional top plan view of the belt of nails along line 4—4 in FIG. 2.

With reference to FIGS. 2 and 4, the inner belt (20) is similar to the outer belt (10) but thicker. The inner belt (20) is mounted on the nails (30) parallel to the outer belt (10) and comprises multiple inner brackets (21) and an inner connecting rib (23). The inner brackets (21) and connecting ribs (23) are connected alternately to each other in a straight line. Each inner bracket (21) is cylindrical and has a top end (not numbered), a bottom end (not numbered), a central axis (not shown), an external periphery (not shown) and an inner nail hole (22). The inner nail hole (22) is defined axially through the inner bracket (21) from the top end to the bottom end and has a diameter (not numbered), an inner surface (not numbered) and multiple longitudinal grooves (221). The longitudinal grooves (221) are defined equidistance apart on the inner surface of each inner nail hole (22). The tip of each nail (30) passes through the top end and is held inside the inner nail hole (22). The diameter of the inner nail hole (22) is smaller than the diameter of the shank of the individual nail (30) so the tip of the each nail (30) will be held firmly inside the inner nail hole (22). To hold the tip of the nail (30) more firmly in place, the inner recesses (221) are filled with an adhesive substance, such as glue (40).

The inner connecting ribs (23) are formed integrally with and protrude transversally from the external periphery of one inner bracket (21) and connect adjacent inner brackets (21) together. The inner connecting rib (23) has a top (not numbered), a bottom (not numbered) and two inner notches (231). The inner notches (231) are respectively defined at the top and the bottom of the inner connecting rib (23). Hence, the inner connecting rib (23) will break smoothly more easily when the inner brackets (21) are separated from the belt of nails because of the inner notches (231).

Each nail (30) is held individually by a pair of the corresponding outer and inner brackets (11, 21) in the outer and the inner belts (10, 20).

Figure 5:
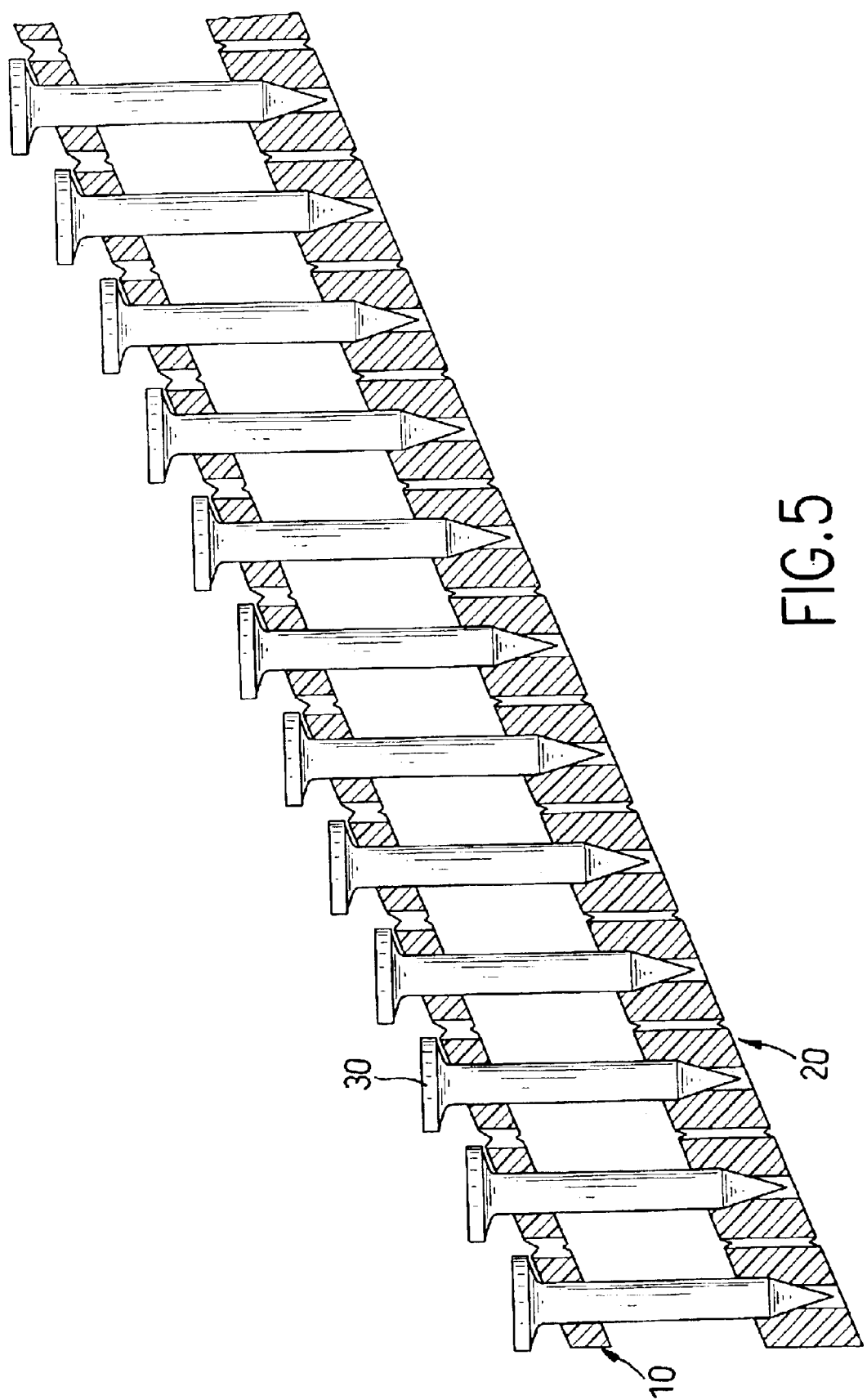
FIG. 5 is a side plan view in partial section of a second embodiment of belt of nails in accordance with the present invention.
Figure 6:
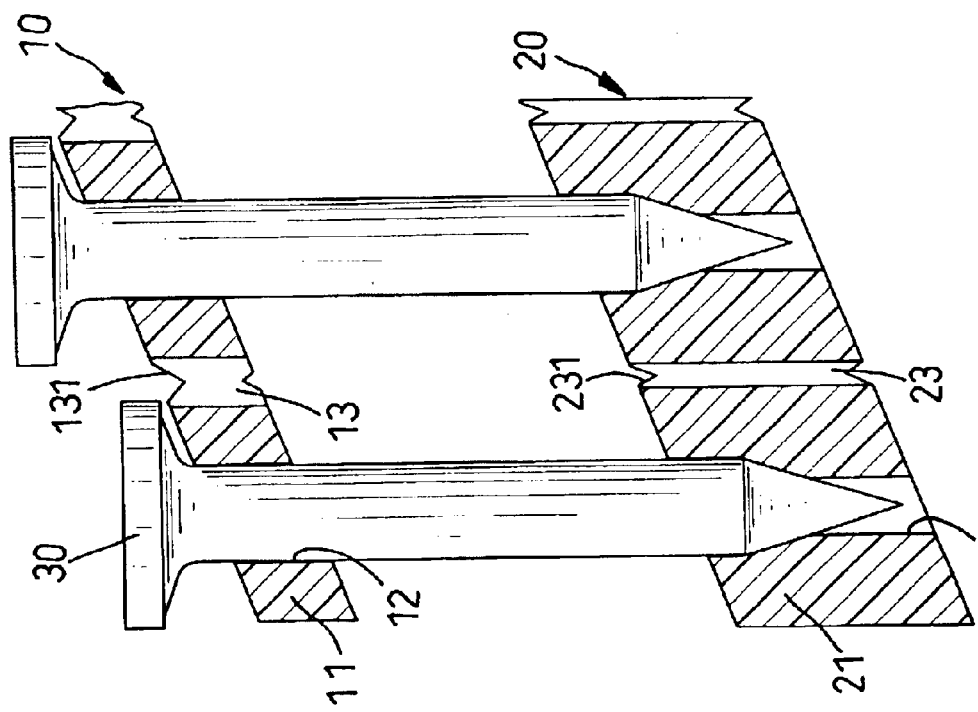
FIG. 6 is an enlarged side plan view in partial section of a portion of the belt of nails in FIG. 5.

With reference to FIGS. 5 and 6, nail magazines for nailer come in various configurations, and many require a belt of the nails with the nails (30) at an angle. Therefore, a second embodiment of the belt of nails in accordance with the present invention has the brackets and holes arranged at an angle to meet the requirements of the magazines.

Figure 7:
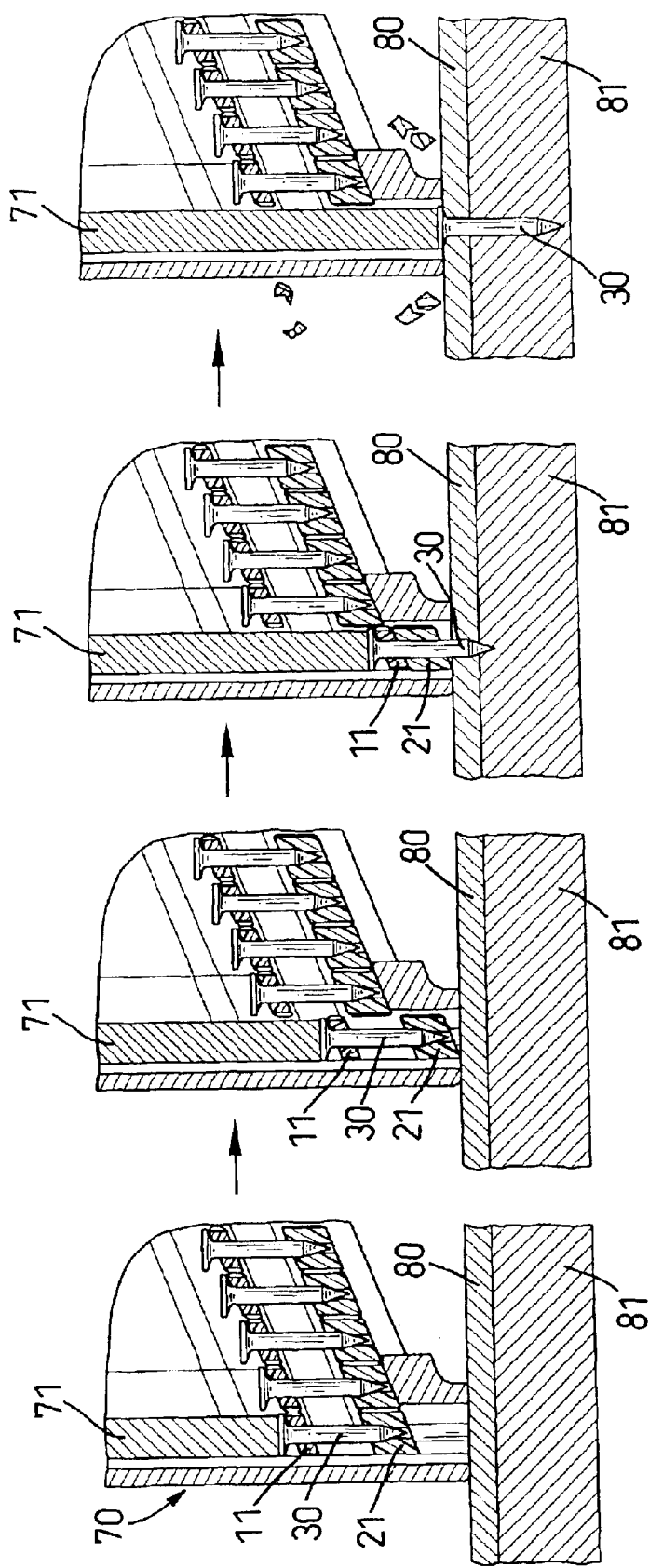
FIG. 7 is an operational side plan view sequence in partial section of a nail driven from a belt of nails in FIG. 5.
Figure 8:
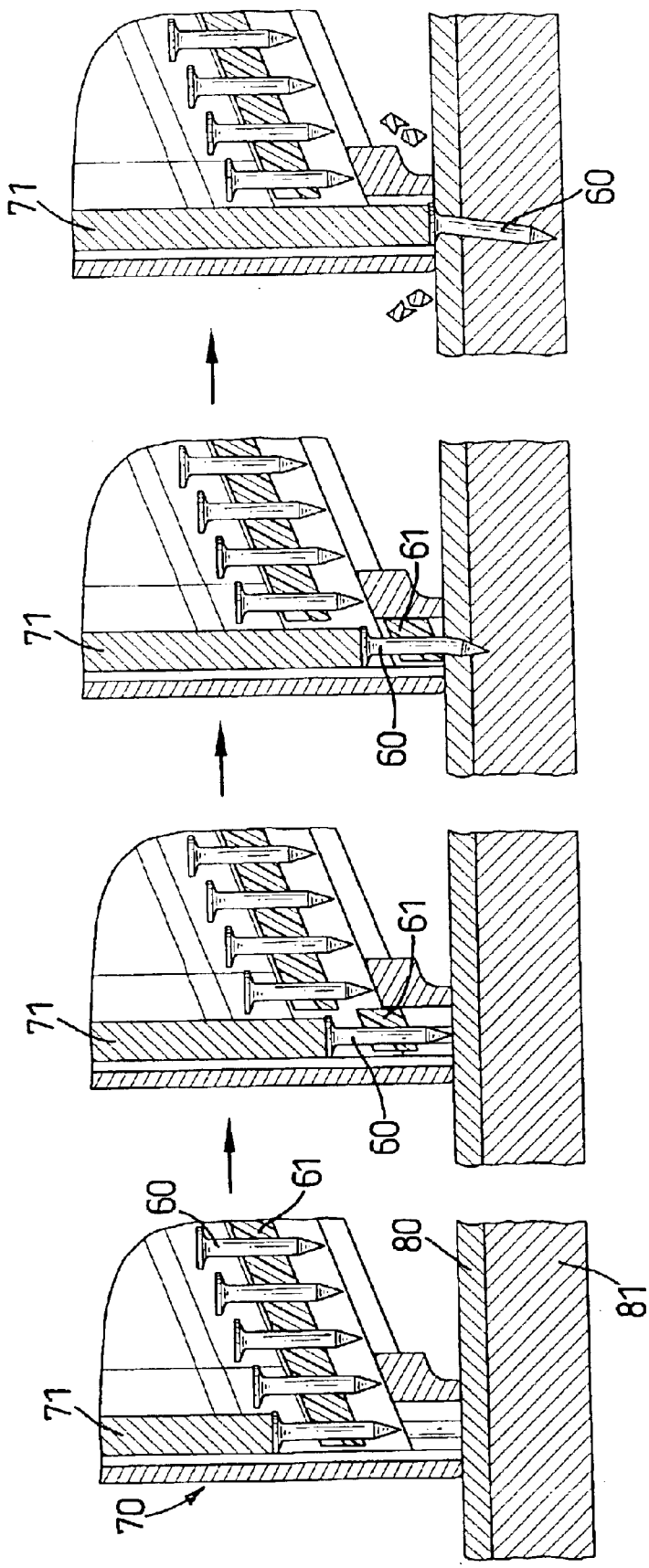
FIG. 8 is an operational side plan view sequence in partial section of a nail driven from a conventional belt of nails in accordance with the prior art.

With reference to FIGS. 2 and 7, nails (30) are individually driven from the belt of nails by a nailer (70) to fasten a wooden piece (80) to a concrete wall (81). The nail punch (71) strikes a nail (30) indexed under the nail punch (71), separates the nail (30) and the attached brackets (11, 21) from the belt of nails and drives the nail (30) through the wooden piece (80) into the concrete wall (81). The outer and the inner notches (131, 231) allow the indexed nail (30) to separate without distorting the adjacent brackets (11, 21) or interfering with the next nail (30).

The separated inner bracket (21) will initially contact the surface of the wooden piece (80) and hold the nail (30) in proper alignment as the nail (30) penetrates the wooden piece (80) and the concrete wall (81). As the nail (30) drives through the separated outer and the inner brackets (11, 21), the separated nail (30) is held perpendicular to the surface of the wooden piece (80). The head of the separated nail (30) breaks the separated outer and inner brackets (11, 21) as the nail (30) drives completely through the wooden piece (80) and into the concrete wall (81). When the nail punch (71) returns to its retracted position, the next nail (30) is indexed under the nail punch (71) in proper alignment to be driven into the next desired position.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A belt of nails comprising:
   an outer belt made of a brittle material and having
      multiple outer brackets connected to each other in a straight line, and each outer bracket being cylindrical and having
         a top end;
         a bottom end; and
         an outer nail hole defined through the outer bracket from the top end to the bottom end and having a diameter and an inner surface; and
      multiple outer connecting ribs alternately connecting the outer brackets, each outer connecting rib formed integrally between adjacent outer brackets, connecting the adjacent outer brackets together and having a top, a bottom and two notches respectively formed in the top and bottom of each outer connecting rib;
   an inner belt parallel to the outer belt, made of a brittle material and having
      multiple inner brackets connected to each other in a straight line, and each inner bracket being cylindrical and having
         a top end;
         a bottom end; and
         an inner nail hole defined through the inner bracket from the top end to the bottom end of the inner bracket and having a diameter and an inner surface; and
      multiple inner connecting ribs alternately connecting the inner brackets and each inner connecting rib formed integrally between adjacent inner brackets, connecting the adjacent inner brackets together and having a top, a bottom and two notches respectively formed in the top and bottom of each inner connecting rib; and
   multiple nails respectively mounted in pairs of corresponding the outer and the inner nail holes, each nail having
      a shank having a top end, a bottom end and a uniform diameter larger than the diameters of the outer and the inner nail holes and passing through a corresponding one of the outer nail holes and into a corresponding one of the inner nail holes;
      a tip formed at the bottom end of the shank and held inside the corresponding inner nail hole; and
      an enlarged head formed at the top end of the shank.

2. The belt of nails as claimed in claim 1, wherein
   each of the inner nail holes further has multiple longitudinal grooves defined equidistantly apart on the inner surface of each inner nail hole; and
   each of the outer nail holes further has multiple longitudinal grooves defined equidistantly apart on the inner surface of each outer nail hole;
   wherein an adhesive fills the longitudinal grooves in each of the outer and inner nail holes.

3. The belt of nails as claimed in claim 2, wherein the brittle material for the inner and outer belts is plastic.

* * * * *